(12) United States Patent
Leroux

(10) Patent No.: US 10,732,381 B2
(45) Date of Patent: Aug. 4, 2020

(54) OPTICAL DEVICE FOR OBSERVING AN OBJECT, MINIMISING THE INTERNAL REFLECTION PHENOMENON

(71) Applicant: LRX INVESTISSEMENT, Bavent (FR)

(72) Inventor: Thierry Leroux, Bavent (FR)

(73) Assignee: LRX INVESTISSEMENT, Bavent (FR)

( * ) Notice: Subject to any disclaimer, the term of this patent is extended or adjusted under 35 U.S.C. 154(b) by 113 days.

(21) Appl. No.: 15/315,532

(22) PCT Filed: Jun. 1, 2015

(86) PCT No.: PCT/FR2015/051433
§ 371 (c)(1),
(2) Date: Dec. 1, 2016

(87) PCT Pub. No.: WO2015/185837
PCT Pub. Date: Dec. 10, 2015

(65) Prior Publication Data
US 2017/0176715 A1    Jun. 22, 2017

(30) Foreign Application Priority Data

Jun. 2, 2014 (FR) .................................. 14 54975

(51) Int. Cl.
*G02B 9/12* (2006.01)
*G02B 27/00* (2006.01)
(Continued)

(52) U.S. Cl.
CPC ............... *G02B 9/12* (2013.01); *G02B 1/10* (2013.01); *G02B 5/22* (2013.01); *G02B 27/0018* (2013.01); *G02B 21/02* (2013.01)

(58) Field of Classification Search
CPC ....................................................... G02B 9/12
(Continued)

(56) References Cited

U.S. PATENT DOCUMENTS 5,880,887 A     3/1999  Goto
5,980,453 A *  11/1999  Forkey ............... A61B 1/00193
                                                    600/162
(Continued)

FOREIGN PATENT DOCUMENTS

JP       H08179105 A     7/1996
JP       H09279109 A    10/1997
JP       2011164494 A    8/2011

OTHER PUBLICATIONS

International Search Report for PCT/FR2015/051433 dated Aug. 5, 2015.

*Primary Examiner* — James C. Jones
(74) *Attorney, Agent, or Firm* — Bachman & LaPointe, P.C.

(57) ABSTRACT

A lens unit for observing an object, comprises an optical system comprising one or more successive lenses, and an optical device, comprising: at least one first optical element of the lens type, defining a front surface and a rear surface, the first optical element being produced from an optically transparent material and having a refractive index "n1", a second optical element, defining a front surface and a rear surface, and being optically coupled by its front surface to the rear surface of the first optical element, the second optical element being produced from a material with a refractive index n2 and provided with at least one portion produced from a material optically absorbing visible light. The optical device being substituted for the lens of the optical system or at least for the end lens among the successive lenses in the optical system.

14 Claims, 7 Drawing Sheets

(51) Int. Cl.
*G02B 5/22* (2006.01)
*G02B 1/10* (2015.01)
*G02B 21/02* (2006.01)

(58) Field of Classification Search
USPC .......................................................... 359/784
See application file for complete search history.

(56) References Cited

U.S. PATENT DOCUMENTS

| | | | |
|---|---|---|---|
| 2006/0082902 A1* | 4/2006 | Matsui | G02B 3/0031 |
| | | | 359/722 |
| 2010/0110569 A1 | 5/2010 | Lin | |
| 2015/0022894 A1* | 1/2015 | Yamamoto | C08G 59/50 |
| | | | 359/580 |

* cited by examiner

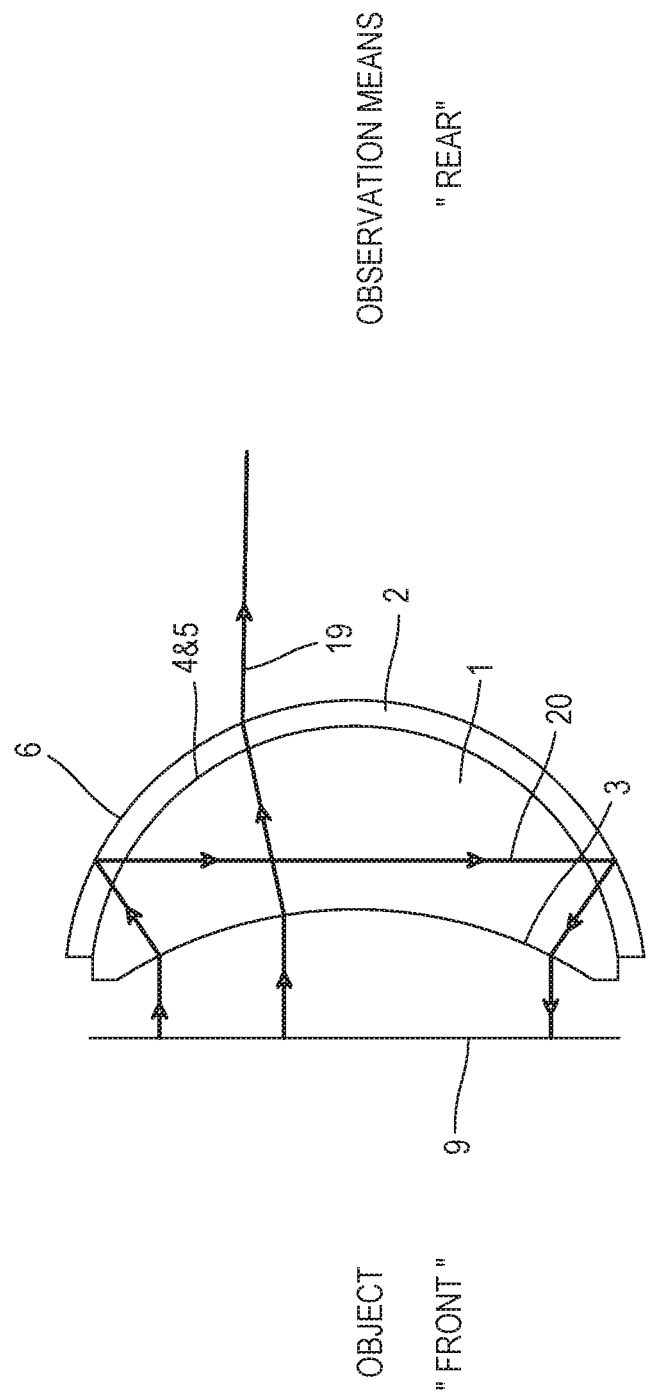

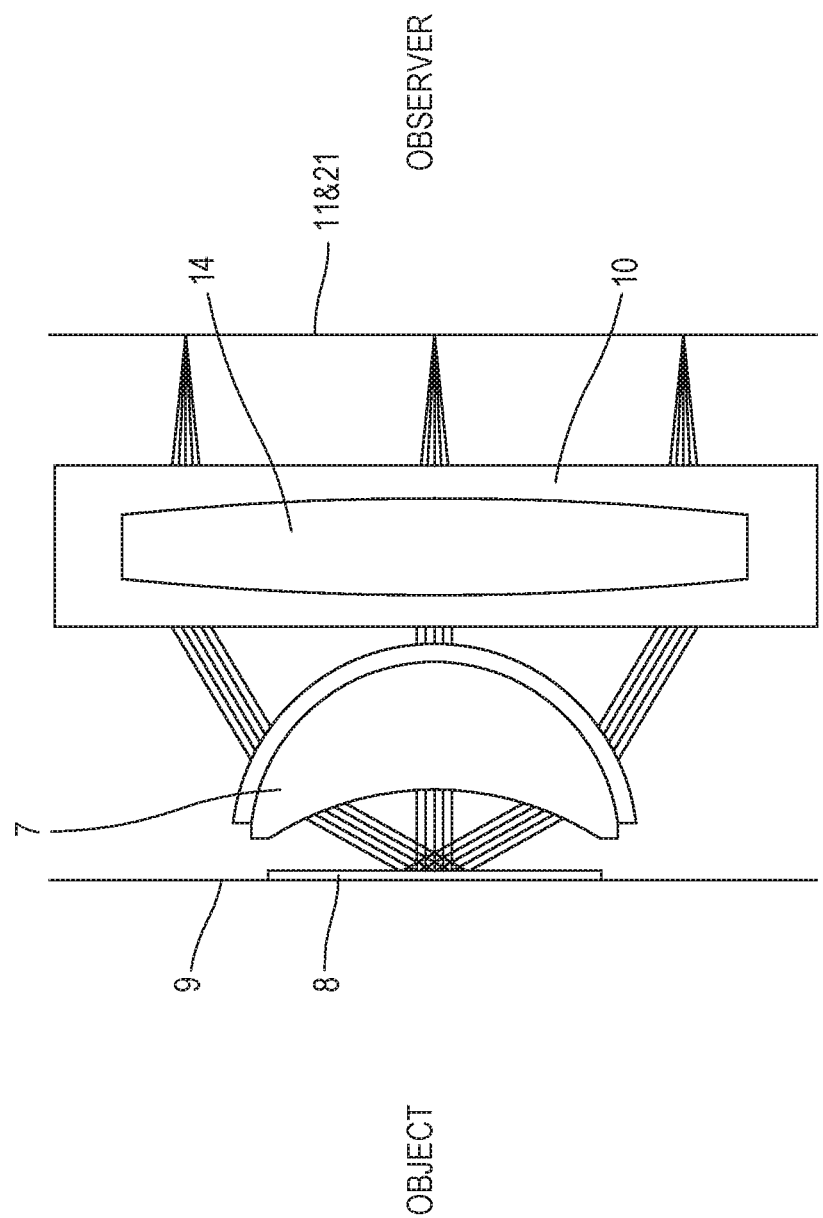

OPTICAL DEVICE FOR OBSERVING AN OBJECT, MINIMISING THE INTERNAL REFLECTION PHENOMENON

BACKGROUND OF THE INVENTION

The present invention applies to the production of optical elements used in lenses of the microscopic or conoscopic type and to the solving of a drawback inherent in current production methods, observed mainly when the angular field or the numerical aperture of these lenses becomes great.

The optical solutions adopted in the production of lenses of the "microscope" type, and in particular when the numerical aperture is large, use, normally and for lenses close to the object to be observed or measured, convergent lenses of the meniscus, plano-convex and more rarely biconvex type, which may, with regard to their convex part, be oriented towards to the image plane as far as a hemisphere. Various convergent lenses are shown on the first line of FIG. 1, while various lenses of the divergent type are shown on the second line of this FIG. 1.

This type of convergent lens is also used in a similar fashion in other types of equipment, in particular flux metrology or conoscopy.

Such a convergent lens may be formed as follows:
  a first surface, oriented towards the object, spherical or aspherical, concave, planar or convex;
  a transparent material with a refractive index >1. As a general rule the glasses used in optics have a refractive index of between 1.4 and 1.95;
  a second convex, spherical or aspherical surface, which may range up to a form close to a hemisphere.

The axes of revolution of the first and second surfaces are merged with the optical axis of the lens. The geometrical properties (radii of curvature) of these surfaces are such that the resultant lens is convergent (with a positive focal length).

The lenses that are most used in the context of optical assemblies with a high numerical aperture are general of the "convergent meniscus" type ("positive meniscus").

So-Called "Total Internal Reflection" Phenomenon

It is well known that a light ray propagating in a medium with a refractive index n1 may, in a condition of incidence at an angle less than the critical theta angle ($\theta_c$), be totally reflected where it encounters a medium with a lower refractive index n2.

The critical angle is given by: $\theta_c = \arcsin(n2/n1)$.

In the context of a microscopic or conoscopic lens used for the applications mentioned above, the incident light emitted by the sample may perfectly, because of this phenomenon, be returned towards the sample, thus causing parasitic reflections that may compromise the observation thereof or the precision of the measurement.

For lasses with a very high index and in the case of a transition from the glass to air, the critical angle is very small (around 33° with glass of the S-LAH65 type with an index of 1.8 at 546 nm) as can be seen on the numerical simulation in FIG. 2. This simulation is given by way of example, the same type of phenomenon being able to be observed whatever the material used (here the glass of make Ohara with the reference S-LAH65).

This phenomenon possibly has important consequences for the properties of convergent lenses.

If the characteristics of the lens and the material used so permit, it is possible to observe this phenomenon experimentally, by pointing a laser in the directions and positions indicated in FIG. 4 for example: the first ray (solid line) passes normally through the system with a transmission coefficient 98.4%, the second (broken lines) undergoes two total reflections before returning towards the source with a reflection coefficient of 97.7%.

It is possible to simulate the behaviour of a lens of this type with ad hoc software tools, such as for example the Code V, ZEMAX or other programs. The simulation in FIG. 5 carried out with the ZEMAX software also shows the response of the component to an extended source placed in front of it. It is found that the region to which the total internal reflection phenomenon relates is annular in form.

The result of simulation of the reflected intensity in the plane of the object shows that, for an incoming flux of 1 W/cm$^2$, the reflected intensity may attain 2.4 W/cm$^2$.

Naturally these figures depend on the exact geometry of the meniscus in question.

It is on the other hand clear, in the light of the retroreflected energy levels (+240%), that this behaviour poses a metrological problem in the configuration of the system or of the pair consisting of sample to be measured and measuring system is such that the measurement is contaminated.

Solutions of the Prior Art

Among the solutions that can be envisaged by a person skilled in the art:
  anti-reflection treatment.
  It can be found, in accordance with FIG. 3, that even if a treatment of the anti-reflection type may improve the behaviour of the interface at angles less than the critical angle by reducing the reflected intensity for angles less than or close to the critical angle, the value of this angle is not modified thereby and the phenomenon persists beyond this angle. The calculation in FIG. 3 is given here by way of example, the same behaviour being able to be observed whatever the material used and whatever the stacking of thin layers used for producing the anti-reflection treatment.
  Anti-reflection treatments cannot therefore provide a satisfactory solution.
  Limitation of Radii of Curvature
  Another possible solution consists of limiting the radii of curvature of the lenses so as to have to use only angles less than the critical angle causing total internal reflection.
  In the latter case, the other performances of the system are greatly degraded thereby or cannot be achieved.
  For example, and if the example of FIGS. 4 and 5 is taken, for which the numerical aperture of the system is sin(88°) =0.9994, a restriction in the diameter of the first optical surface (see FIG. 6) makes it possible to be significantly free from retroreflections.
  The retroreflected flux changes from 5.2 W to around 12 mW, that is to say a reduction by a factor of 400.
  However, the performances of the lens are drastically affected thereby since the numerical aperture of the system changes to sin(61°)=0.876, which from an optical point of view is a dramatic reduction in the angular field.

Technical Problem

The problem that has to be solved is therefore significantly reducing the level of retroreflections inherent in this type of lens so as to guarantee that the angular and spatial distribution of light issuing from a device under test is not disturbed by the presence of the analysis system and more particularly of the convergent optical element or elements placed at the entry thereto.

SUMMARY OF THE INVENTION

This objective is achieved by the invention, which relates to an optical device for observing an object, comprising at least one first optical element of the lens type, defining a front surface oriented towards the object to be observed and a rear surface opposite to said object, said first optical element being made from an optically transparent material and having a refractive index "n1". According to the invention, this device comprises a second optical element with a predetermined thickness, defining a front surface oriented towards the object and a rear surface opposite to the object, and being optically coupled by its front surface to the rear surface of the first optical element, said second optical element being produced from a material with a refractive index n2 and provided with at least one portion produced from a material optically absorbing visible light.

The invention may also have one or other or all of the following aspects, among which:
- a second optical element with a predetermined thickness, defining a front surface oriented towards the object and a rear surface opposite to the object, and being optically coupled by its front surface to the rear surface of the first optical element, said second optical element being produced from a material with a refractive index n2 and provided with at least one portion produced from a material optically absorbing visible light,
- the portion of the second optical element produced from an optically absorbent material is the portion of the second optical element that is most liable to be the origin of total internal reflections,
- the whole of the second optical element is produced from an optically absorbent material,
- the optically absorbent material constituting the second optical element is spectrally neutral,
- the refractive index n2 of the second optical element is less than the refractive index n1 of the first optical material,
- the rear surface of the first optical element is convex and the second optical element is in the form of a cap,
- the thickness of the cap is constant,
- the indices n1 and n2 of the materials constituting the first and second optical elements are between 1.43 and 1.96,
- the transmission coefficient of the absorbent material constituting the second element is between 1% and 99%,
- the minimum thickness of the second optical element is chosen so as to be greater than the coherence length of the light emitted or reflected by the object being observed, in the material used.

The invention moreover relates to a lens unit of the microscope type, comprising an optical transport and magnification system comprising a lens or a plurality of successive lenses, and a field lens, able to produce an image of the object observed in the image plane, comprising at least one device coming to be substituted for the lens of the optical system or at least for the lens of the optical system closest to the object being observed, among said successive lenses in the optical system.

The invention moreover relates to a lens unit of the conoscope type, comprising an optical magnification system comprising a lens or a plurality of successive lenses, making it possible to produce an image of the angular distribution of the flux coming from the object being observed, coming to be substituted for the lens of the optical system or at least for the lens of the optical system closest to the object being observed, among said successive lenses in the optical system.

The invention also relates to an optical instrument comprising a lens unit of the above type.

BRIEF DESCRIPTION OF THE DRAWINGS

The invention will be understood better in the light of the following description, constructed around a non-limitative example embodiment and given with reference to the following figures, among which:

the aforementioned

FIG. 4: a convergent lens through which an incident ray (solid line) passes and causing another ray to undergo a double total internal reflection (broken lines);

FIG. 5, a simulation of the behaviour of the lens with an extended source, showing an annular peripheral portion of the lens more subject to internal reflections, FIG. 6: this same simulation with however a reduction in the diameter of the optical surface, FIG. 7 shows an optical device according to the invention comprising two optically coupled elements making it possible to reduce the internal reflection phenomenon, FIG. 8 illustrates the optical device according to the invention associated with an optical system.

DETAILED DESCRIPTION

Figure 1:
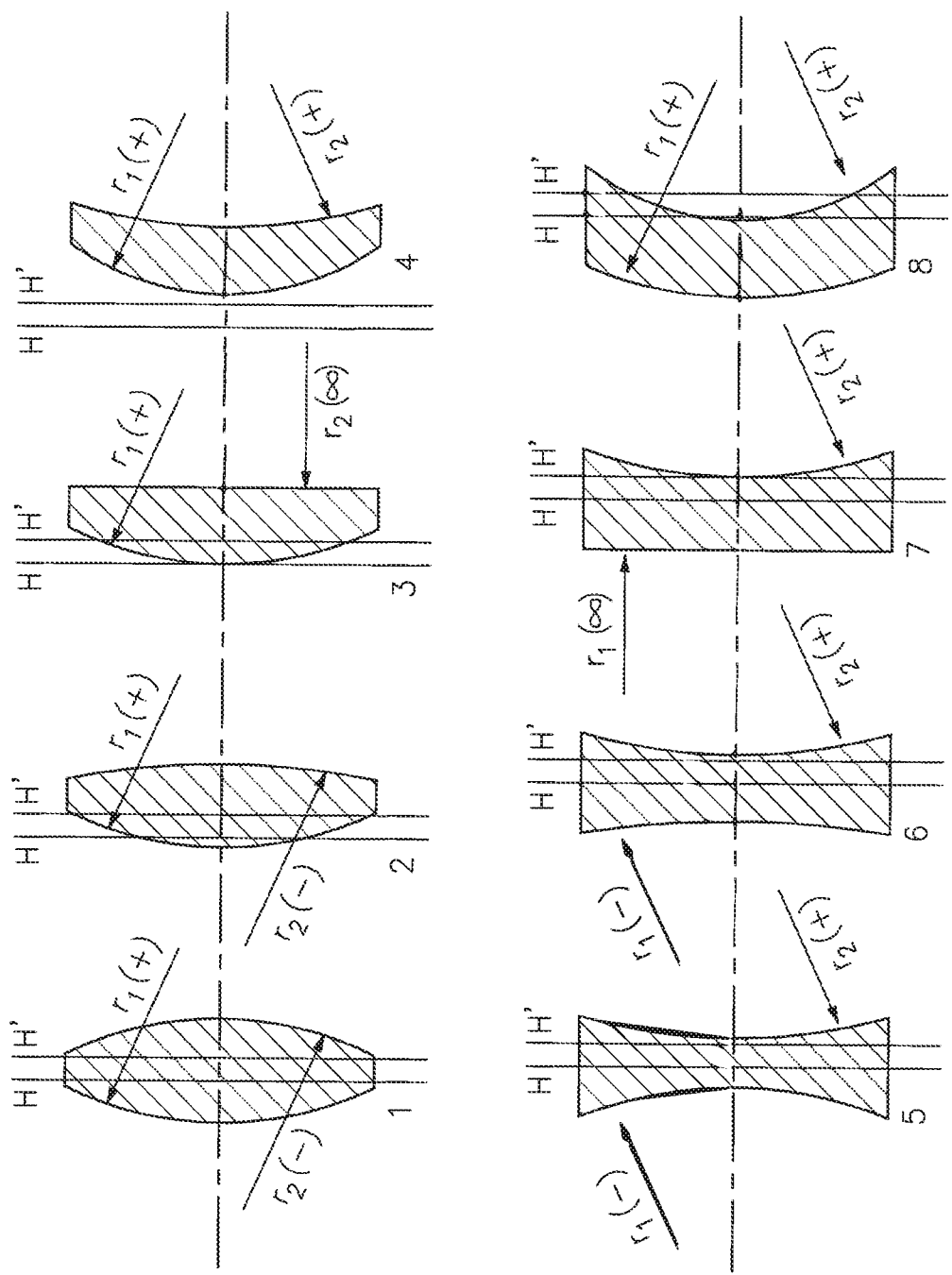
FIG. 1 shows various convergent and divergent lens structures, the aforementioned
Figure 3:
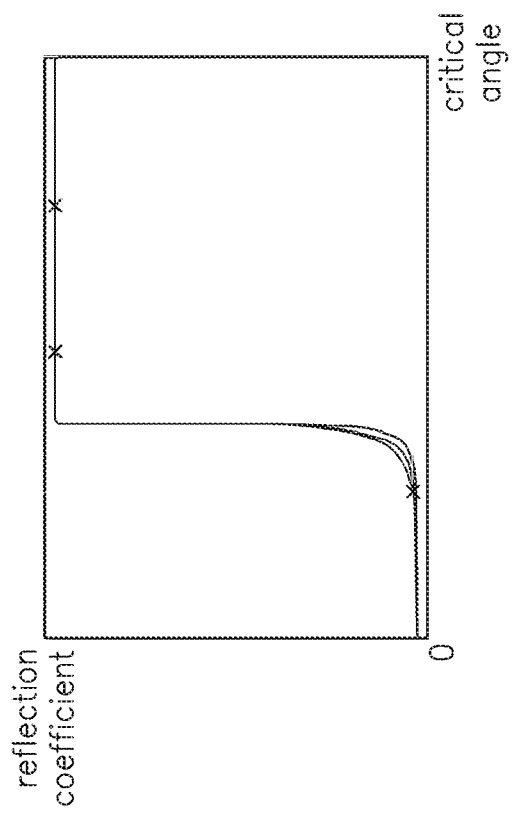
FIGS. 2 and 3 show graphs illustrating the change in the internal reflection coefficient of the S-LAH65 glass at 550 nm as a function of the angle of incidence, and showing the critical angle as from which total internal reflection can be observed, without antireflection treatment of the glass in question (FIG. 2), and with (FIG. 3)
Figure 6:
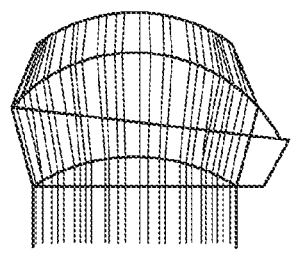
FIGS. 4 to 6 show, by means of a schematic view.
Figure 2:
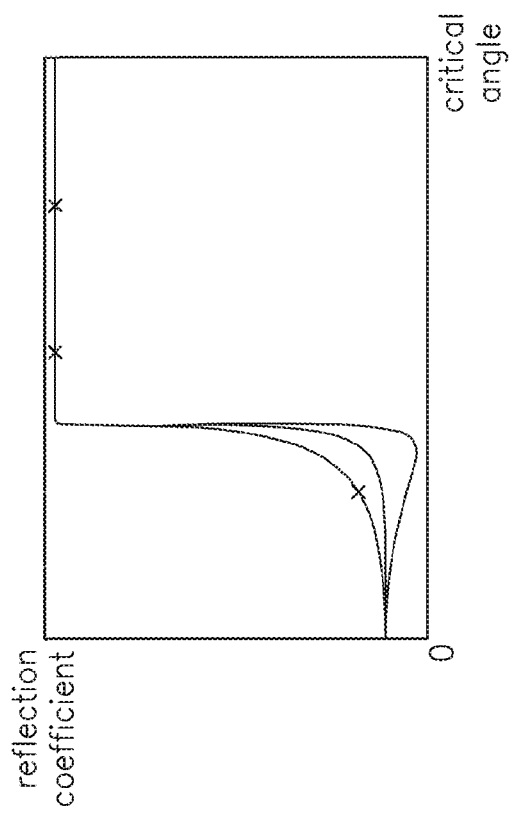
Figure 5:
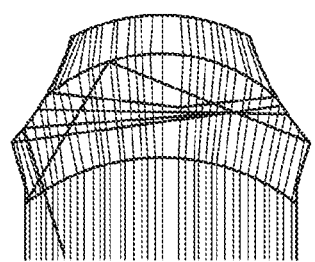

In accordance with FIG. 7, the invention is based on the introduction of a "shell" made from absorbent material 2 up against the external optical surface of a lens 1 of a lens unit for observing an object, such as a lens unit of a microscope or conoscope used in the field in particular of metrology.

More precisely, in accordance with FIG. 7, a lens unit for observing an object (situated to the left in this FIG. 7, and corresponding to the "front" orientation in the remainder of the text), comprises conventionally at least one lens 1 (or an optical system provided with a succession of lenses) interposed between the object and a means for observing the image created by the lens or the optical system in the image plane of this lens or system.

The observation means situated to the right in FIG. 7 corresponding to the "rear" orientation in the remainder of the text can consist of an eyepiece, a matrix sensor, a unitary sensor or other sensor etc according to the nature of the observation objective to be achieved (microscope, conoscope or other).

The object emits light rays that pass through the lens or successive lenses and form an image observed by the observation means.

Unlike projection instruments, in which the object observed is a light source where by definition the intensity of the rays emitted by can be increased, in observation instruments it is not generally possible to increase the intensity of the light rays emitted by the object, except by adding illumination directed towards the object but which would also interfere with the rays that this object naturally emits and thus the required observation and/or measurement.

Furthermore, in projection instruments such as the one illustrated in the American U.S. Pat. No. 5,880,887, it is the front surface of the lens (directed towards the light source) that is convex, and the rear surface is planar and the site of the internal reflection of a parasitic source coming from the side of the observation. The solution in this projection instrument has been to have an absorbent material on the front surface of the lens, providing this material with a concave rear surface and concave front surface.

On the other hand, in the context of instruments for observing an object, the object itself and the instrument that observes it can constitute a parasitic light source when some of the rays emitted by the object undergo an internal reflection on the convex rear surface of the lens. However, any disturbance of the light rays emitted naturally by the object is to be prohibited, in particular and especially those caused by the optical system that observes it, and in particular and especially those that come to observe part of the intensity of the flux emitted by the object.

Thus the solutions used in the projection instruments for reducing the disturbances caused on the rays emitted by the projected light source, and which consist of using a material absorbing the light rays emitted by a parasitic source situated on the observation side, can obviously not be transposed to observation instruments.

Thus, in a novel and surprising fashion in the field of optical instruments for observing objects, the optical coupling of at least one lens of the optical system of the lens unit, with a cap made from absorbent material, was considered by the inventor to be a possible solution for reducing the internal reflection phenomenon interfering with the observation/measurement of the flux, without excessively impairing this observation/measurement of flux.

To this end, a cap made from absorbent material is fixed to the rear surface of the lens (the one directed towards the observation means and which is convex), the front surface of the cap (directed towards the object) thus being concave (furthermore, in the example illustrated, the rear surface of the cap is convex).

The different technical fields consisting of the display screens in the case of the aforementioned document U.S. Pat. No. 5,880,887 and the metrology in the case of the invention mean that the solutions used in the first cannot obviously be transposed to the other:

In the case of projection, it is a case of not disturbing the image of the object observed by the subject, by light sources external to the subject.

This aim is achieved by placing the absorbing optical element between the image production system (the source) and the subject in accordance with an Object (Source)/Second element (Absorbent)/First element (Disturber)/Observer arrangement. The second surface (Convexity) of the absorbent cap is this time oriented towards the object (the light source).

In the present case of the observation of an object in particular for metrology applications, it is a case of not disturbing the object observed because of the return of the parasitic light by means of the observation system.

This aim is achieved by means of an absorbent optical element that is placed between the object and the rest of the observation system in accordance with the sequence Object/First element (Disturber)/Second element (Absorbent)/Observer. The second surface (Convexity) of the absorbent cap is thus oriented towards the observer or subject.

The expression "optical coupling" is to be understood as the fact that a major part of the light rays passing through the rear surface of the lens also passes through the front surface of the cap of absorbent material.

The expression absorbent material is to be understood as a material absorbing the light emitted by the object, with a degree of absorption not uniformly zero in the visible range (considered to be between 400 and 800 nm).

The absorbent material may be a filter or a glass with an absorption coefficient of between 20% and 40% so as to greatly attenuate the rays while preserving an acceptable intensity for the rays transmitted. So that all the wavelengths used are affected in a similar fashion, the material used may be a spectrally neutral absorbent glass (glasses in the NG series from the manufacturer Schott [R15] or glasses in the ND series from the manufacturer Hoya).

For example, a material of the ND25 or NG5 type may be used.

These two elements are conventionally bonded to each other by means of a film of optical glue (N0A65 for example) with a suitable index and an optically negligible thickness. As a general rule an index close to that of one of the glasses will be chosen, the indexes often being close to 1.5 to 1.6 for example. The thickness will be from a few microns to around 10 microns.

The physical thickness of the shell must be greater than the coherence length of the light emitted or reflected by the object 9 being observed in order to be free from the appearance of interference phenomena. In practice this minimum physical thickness will, for radiations of the "natural light" type, be between 0.1 and 2 mm.

FIG. 7 describes the component obtained. Such a component will be used in an optical system of the microscope or conoscope lens type instead of the "conventional" convergent element.

According to the principle of the invention:

For a ray coming from the object, the absorbent material of the shell is passed through only once if this ray is transmitted (ray 19) whereas it will be passed through 4 times if this ray is retroreflected (ray 20) inside the component. The rays retroreflected by the component are therefore 4 times more absorbed than transmitted rays.

For a ray coming from the object, transmitted by the component and partially reflected once again towards the object by the rest of the optical system (not illustrated), it passes through the absorbent material twice. The rays retroreflected by the following components are therefore twice as absorbed as the transmitted rays.

Aid to Sizing of the Optical Device

The following formulae are given solely as a tool for assisting sizing in the context of the practical implementation of the invention.

The function of the shell is to reduce the intensity of the rays reflected onto the object and achieves this by virtue of the absorbent nature of its constituent material.

It also achieves this through the choice of its refractive index $n_2$.

Sizing of the Transmission Coefficient

If the thickness of the shell has a uniform thickness $D_0$ and its transmission in the axis of $T_0$, the thickness passed through at the critical angle $\theta_C$ is given by:

$$D_C = \frac{D_0}{\cos\theta_C}$$

That is to say:

$$D_C = \frac{D_0}{\cos\left(\sin^{-1}\left(\frac{1}{N}\right)\right)} = \frac{D_0}{\sqrt{1-\frac{1}{N^2}}} = \frac{D_0 N}{\sqrt{N^2-1}}$$

The transmission of a single retroreflected ray TC—at the critical angle θC—is given by:

$$T_C = T_0^{\frac{4D_C}{D_0}} = T_0^{\frac{4N}{\sqrt{N^2-1}}}$$

and $$\frac{T_C}{T_0} = T_0^{\frac{4N}{\sqrt{N^2-1}}-1}$$

If for example:
T0=32%
N=1.5
then TC/T0=0.69%
and TC=0.2%, that is to say a a reduction in the intensity of the reflected rays by a factor of 500.

It can therefore be seen that, if the parameters of the materials are well chosen and at the cost of a controlle dattenution of the transmitted rays, the retroreflected rays are very greatly attenuated.

Sizing of the Refractive Index of the Shell

The choice of the refractive index of the shell can also be used to reduce internal reflections since it can be chosen so as to increase the critical angle obtained at the interface between the lens and the shell, and the one obtained at the rear of the shell at its interface with the air, and thus increase the angle of the incident rays not able to be reflected.

Figure 11:
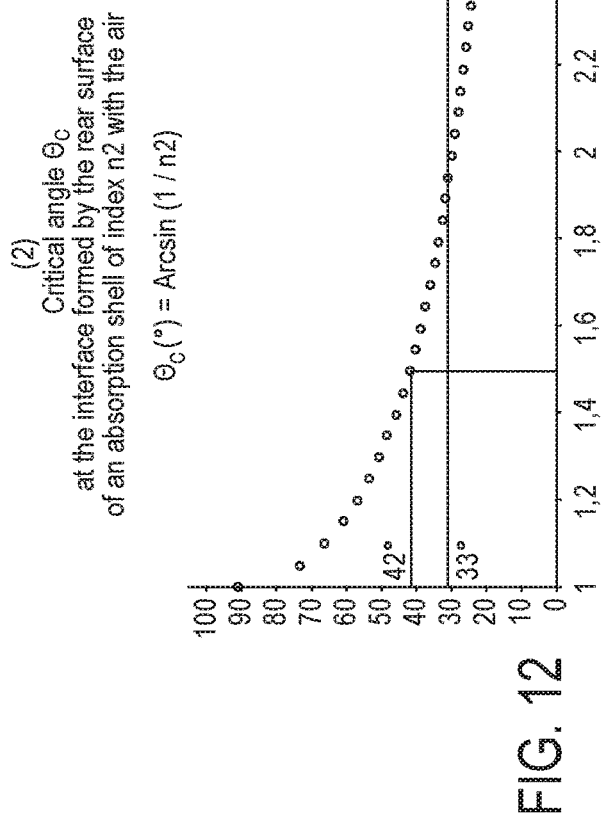
FIGS. 11 to 14 show four graphs that can be used for sizing a parameter of the device according to the invention (refractive index of the shell.)

The choice of the index n2 of the shell may result from a compromise between various phenomena:

FIG. 11 shows the change in the critical angle (the angle beyond which reflection occurs at an interface between two materials with different indices) observed at the interface between a convergent lens of index n1=1.82 and a material of index n2. This angle is given by the formula: θ(°)=Arcsin (n2/n1). The higher this critical angle the lower the risks of observing internal reflections. Thus, in accordance with the graph obtained, the critical angle obtained without a shell on the lens of index n1 (which is then in an interface with the air of index n2=1), is 33°, whereas it increases to 56° when a shell of index 1.5 is used. This first observation leads to the use of a relatively high refractive index n2 for the shell.

Figure 12:
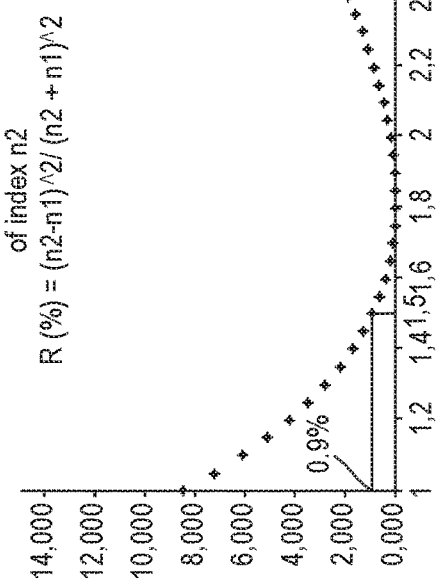

However, FIG. 12 which shows the change in the critical angle obtained at the interface between the shell and the air (at the rear surface 6 of the shell 2) is lower, the higher the refractive index n2 for the shell, from which it results that a high refractive index for the shell would risk increasing the risk of internal reflection that it is precisely wished to avoid.

Figure 13:
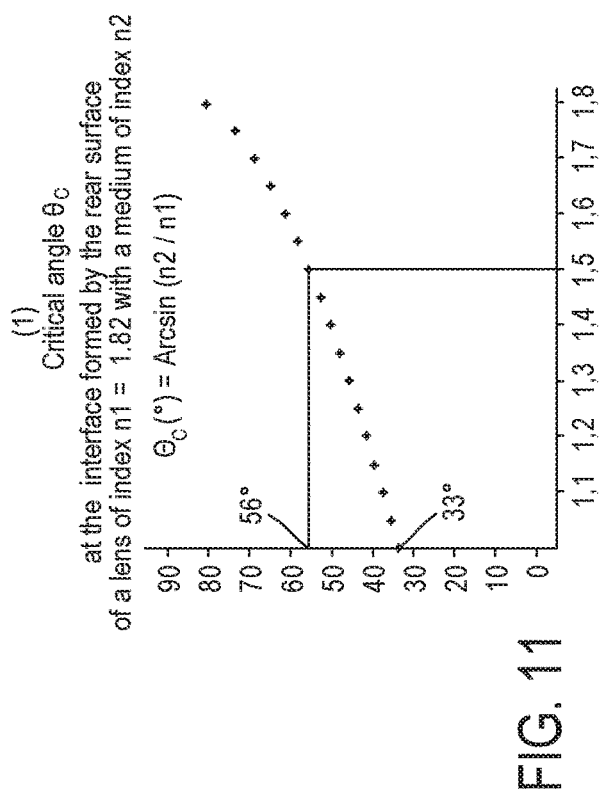

Thus, in accordance with FIG. 13, which juxtaposes the two curves, it is necessary to use, according to the refractive index n1 of the lens the internal reflections of which it is wished to reduce, a refractive index n2 for the shell which makes it possible both to increase the critical angle obtained at the rear of the lens vis-à-vis the critical angle obtained when this lens is in an interface with the air, while defining, at the rear of the shell used, a critical angle at the interfece with the air, also greater than that observed when this lens interfaces with the air.

In the example illustrated, for which an index n2=1.5 for the shell has been chosen, a critical angle is obtained at the interface between the lens and the shell of 42° (much greater than the critical angle obtained for the lens interfacing with the air) and a critical angle at the interface between the rear of the shell and the air of 56°, which increases the angular separation of the rays that will not be reflected.

It can be envisaged choosing the index of the shell from the point of intersection of the two curves (they intersect when n2=√n1) by fixing it for example at n2=√n1+/−30%.

Figure 14:
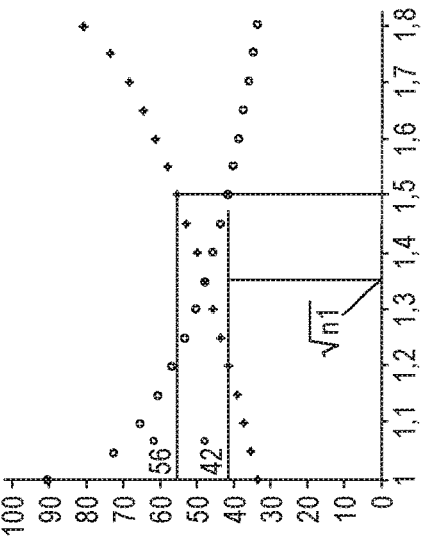

Moreover, in accordance with FIG. 14, it will be possible to choose this refractive index n2 according to the coefficient of reflection R at the lens/shell interface, given by the formula $R(\%)=(n2-n1)^2/(n2+n1)^2$ Thus, the closer the index of the shell n2 is to that of the lens, the lower the coefficient of reflection. There will therefore be a tendency to choose for the shell a refractive index close to that of the lens, while making it possible to obtain a higher critical angle than that obtained without a shell.

For example, it will be possible to fix it at a value of between n1−30% and n1+30%.

Performances Found

The results of the global modelling of the optical device of FIG. 7 with:

a convergent lens in the form of a meniscus, defining spherical front 3 and rear 4 surfaces, consisting of a transparent optical glass of index n1=1.82 a shell with a constant section in the form of cap, the front surface 5 of which is applied along the rear surface 4 of the lens, with a thickness of 0.2 mm, consisting of an absorbent spectrally neutral glass with an optical index n2=1.5, the shell being optically coupled to the lens with a film of optical glue (NOA65 for example) with an index of 1.524 and a thickness of 10 µm.

Figure 4:
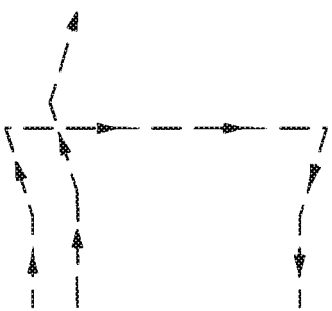

The following is found with respect to the flux reflected by the meniscus of FIG. 4:

The flux having as its origin the retroreflected rays changes from 2.4 W/cm² 10 mW/cm², that is to say a reduction by a factor of 240 when all the rays are taken into account.

The total flux changes from 5.2 W t 85 mW. The residual reflected flux now having as its origin the quality of the non-reflective treatments applied to the external surface of the meniscus.

A very significant improvement in the performances of the system is observed. The disturbances originating in the retroreflected rays become negligible compared with the other sources of parasitic reflections (imperfect non-reflective treatments, reflection on the mechanical parts of the system, for example).

It therefore becomes possible—by virtue of the device of the invention—to produce optical devices with a wide aperture without making the design complex.

Production of a Simple Optical Lens Unit (FIG. 8)

A simple optical lens unit can be obtained by associating the optical device according to claim 7 with an optical system 10 composed of one or more lenses 14, at least one or each of which can be provided, on their rear surface opposite to the object 8 being observed, with a shell made from absorbent material, making it possible to create, on the image plane 11 of the system, an image that can be observed visually by means of an eyepiece 16 or automatically by means of a matrix sensor (not shown in this figure) of the lens system for an optical instrument comprising this lens system, situated at the rear of the lens/cap pair.

Figure 9:
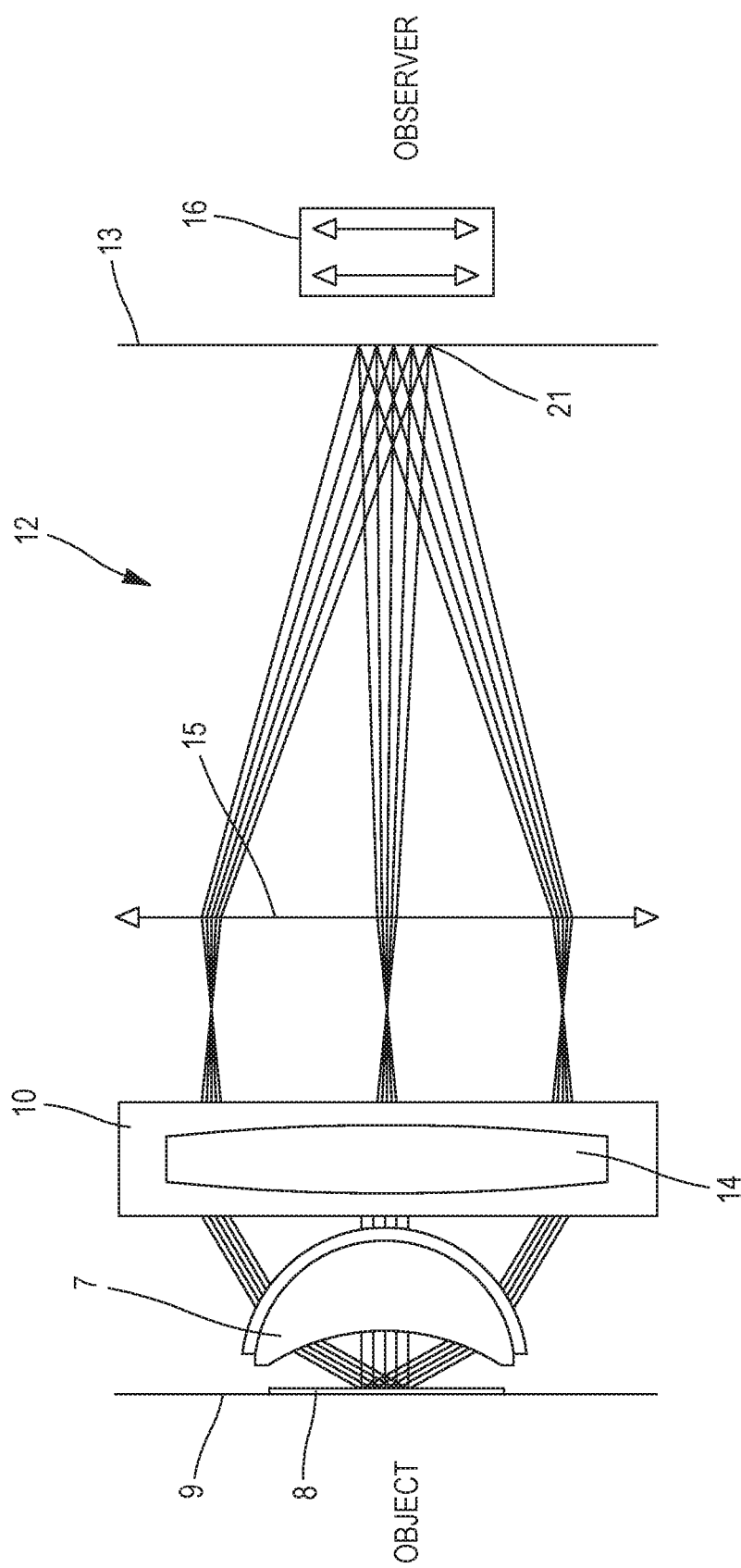
FIG. 9 illustrates the optical device according to the invention in an instrument of the microscope type.

Production of a Lens Unit of the Microscope Type (FIG. 9)

A lens of the microscope type is used to produce, in the image plane 11 of said lens, a magnified image 21 of the object 8, an image that is observed visually by means of an eyepiece 16 or automatically by means of a matrix sensor (not shown in this figure) associated with a transport and magnification optical system 10, 15.

In order to produce such a device 12, the optical element 7 according to the invention provided with a lens optically coupled to a shell will be associated with an optical system 10, composed of one or more lenses 14 making it possible to obtain the desired focus and to correct, in a manner known to persons skilled in the art, the various geometric and colorimetric aberrations of the system, and supplemented by a field lens 15, also referred to as a tube lens.

If one or more of the lenses 14 in the optical system 10 are of the convergent type and also have total internal reflections, they can advantageously be replaced by optical elements of the type of the invention and thus be provided with a shell for reducing internal reflection.

Figure 10:
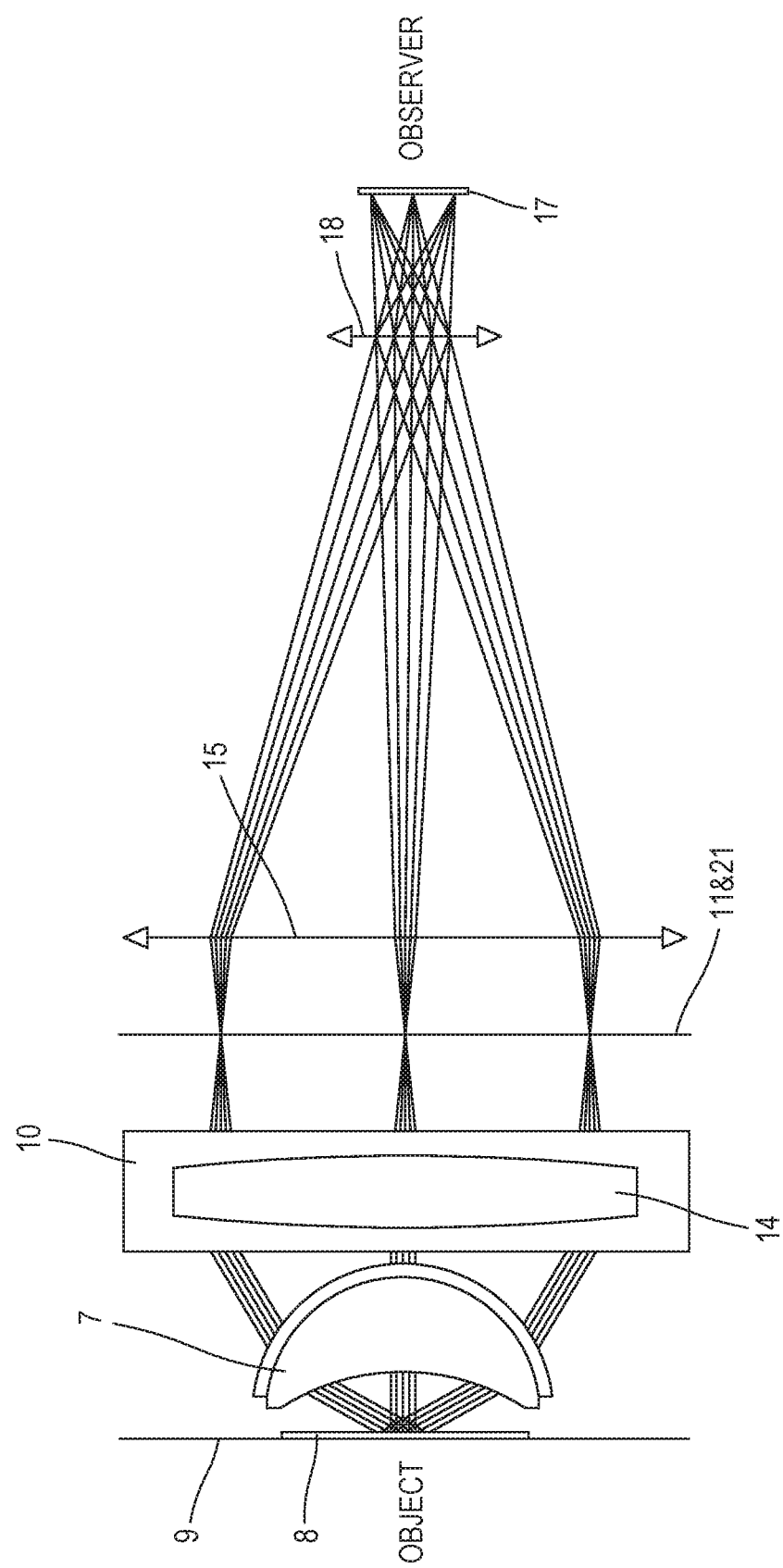
FIG. 10 illustrates the optical device according to the invention in an instrument of the conoscope type.

Production of a Lens Unit of the Conoscope Type (FIG. 10)

A lens of the conoscope type is used to produce, in the image plane of said lens, an image 21 of the angular distribution of the flux emitted or reflected by the object, an image that is observed visually by means of an eyepiece 16, or automatically by means of a matrix sensor 17 associated where applicable with an optical magnification system 18 and a field lens 15.

Instead of the matrix sensor 17, a plurality of unit sensors (a single pixel) can be used, placed in the plane of the image 11 for observing the image 21.

If in the case where a matrix sensor is used the entry aperture of the transport lens 18 serves as an opening diaphragm and adjusts the size of the spot analysed, when a plurality of unit sensors are used, each sensor will be preceded by an approved aperture diaphragm.

In order to produce such a lens unit, the optical element 7 will be associated in a known manner with an optical system 10 composed of one or more lenses 14 making it possible to obtain the required focus and to correct the various geometric and colorimetric aberrations of the system.

If one or more of the lenses 14 are of the convergent type and also have total internal reflections, they can advantageously be replaced by optical elements of the type of the invention.

The invention claimed is:

1. A lens unit for observing an object, comprising:
    an optical system comprising successive lenses, with at least one of the successive lenses being an end lens, and the optical system comprising an optical device, said optical device being substituted for one of the successive lenses of the optical system or the optical device being substituted at least for the end lens among said successive lenses in the optical system;
    said optical device, comprising:
    at least one first optical element comprising a lens, defining a front surface and a rear surface, said first optical element being produced from an optically transparent material and having a refractive index n1,
    a second optical element, defining a front surface and a rear surface, and being optically coupled by its front surface to the rear surface of the first optical element, at least a portion of said second optical element being produced from a material with a refractive index n2 and provided with at least another portion produced from a material optically absorbing visible light.

2. The lens unit according to claim 1, comprising a microscope in which the optical system is a transport and magnification system and further comprises a field lens, the lenses of the system being able to produce a magnified image of the object observed in the image plane.

3. The lens unit according to claim 1, comprising a conoscope, in which the optical system is a magnification system making it possible to produce an image of the angular distribution of the flux from an object being observed.

4. The lens unit according to claim 3, wherein the at least one portion of the second optical element produced from an optically absorbent material is the peripheral portion of the second optical element most likely to be the origin of total internal reflections.

5. The lens unit according to claim 4, wherein all of the second optical element is produced from an optically absorbent material.

6. The lens unit according to claim 5, wherein the optically absorbent material constituting the second optical element is spectrally neutral.

7. The lens unit according to claim 6, wherein the refractive index n2 of the second optical element is lower than the refractive index n1 of the first optical material.

8. The lens unit according to claim 7, wherein the rear surface of the first optical element is convex and the second optical element is in the form of a cap.

9. The lens unit according to claim 6, wherein the thickness of the cap is constant.

10. The lens unit according to claim 8, wherein the indices n1 and n2 of the materials constituting the first and second optical elements are between 1.43 and 1.96.

11. The lens unit according to claim 10, wherein the coefficient of transmission of the absorbent material constituting the second element is between 1% and 99%.

12. The lens unit according to claim 11, wherein the minimum thickness of the second optical element is chosen so as to be greater than the coherence length of the light emitted or reflected by the object being observed, in the material used.

13. An optical instrument equipped with lens unit according to claim 1.

14. An optical device for observing an object, comprising: successive lenses comprising:
    at least one first optical element comprising a lens, defining a front surface and a rear surface, said first optical element being produced from an optically transparent material and having a refractive index n1, a second optical element with a predetermined thickness, defining a front surface and a rear surface, and being optically coupled by its front surface to the rear surface of the first optical element, said second optical element being produced from a material with a refractive index n2 and provided with at least one portion produced from a material optically absorbing visible light and spectrally neutral.

* * * * *